(12) United States Patent
Hoshi

(10) Patent No.: US 7,948,686 B2
(45) Date of Patent: *May 24, 2011

(54) ZOOM LENS AND IMAGE PICKUP APPARATUS INCLUDING THE SAME

(75) Inventor: Koji Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/580,163

(22) Filed: Oct. 15, 2009

(65) Prior Publication Data

US 2010/0033841 A1  Feb. 11, 2010

Related U.S. Application Data (63) Continuation of application No. 11/755,418, filed on May 30, 2007, now Pat. No. 7,623,300.

(30) Foreign Application Priority Data

May 31, 2006  (JP) .................................. 2006-151546

(51) Int. Cl.
 *G02B 15/14* (2006.01)
 *G02B 27/64* (2006.01)
(52) U.S. Cl. ........................................ 359/687; 359/557
(58) Field of Classification Search .................. 359/683, 359/687, 686, 676, 684, 557; 348/240.99–240.3; 396/72–88

See application file for complete search history.

(56) References Cited

U.S. PATENT DOCUMENTS 7,623,300 B2 *  11/2009  Hoshi ............................ 359/687
2007/0019303 A1 *  1/2007  Hamano et al. ................ 359/687

* cited by examiner

Primary Examiner — Ricky L Mack
Assistant Examiner — Zachary Wilkes
(74) Attorney, Agent, or Firm — Canon U.S.A. Inc., I.P. Division (57) ABSTRACT

A zoom lens comprises, from object to image side: a positive first-lens unit; a negative second-lens unit; a positive third-lens unit; and a positive fourth-lens unit; the third-lens unit comprising a negative 3a'th-lens sub-unit and positive 3b'th-lens sub-unit from object side; the second-lens unit and fourth-lens unit moving on the optical axis during zooming; the 3b'th-lens sub-unit moving in a direction perpendicular to the optical axis, thereby displacing an image perpendicular to the optical axis; the 3a'th-lens sub-unit comprising a negative-lens element G3*an* whose both surfaces are spherical, and a positive-lens element whose both surfaces are spherical; the 3b'th-lens sub-unit including a positive-lens element G3*bp* including an aspherical lens surface, and a negative-lens element; wherein, assuming that the indices of the materials of the negative-lens element G3*an* and the positive-lens element G3*bp* are NG3*an* and NG3*bp* respectively, $0.21 < NG3an - NG3bp$ is satisfied.

4 Claims, 7 Drawing Sheets

ZOOM LENS AND IMAGE PICKUP APPARATUS INCLUDING THE SAME

CROSS-REFERENCE TO RELATED APPLICATIONS

This application is a continuation of U.S. patent application Ser. No. 11/755,418 filed May 30, 2007, which claims priority to Japanese Patent Application No. 2006-151546-filed May 31, 2006, each of which is hereby incorporated by reference herein in its entirety.

BACKGROUND OF THE INVENTION

1. Field of the Invention

The present invention relates to a zoom lens, which is particularly suitable as a photographic optical system such as a video camera, a camera for silver-salt film, a digital camera, or the like.

2. Description of the Related Art

When photographing an object, if vibration occurs in a photographic system, blurring occurs in the photographic image. In order to solve this problem, various types of image stabilizing optical systems, including image stabilizing performance for preventing blurring from occurring in photographic images, have been proposed.

Many zoom lenses serving as photographic systems have been known wherein a part of a lens unit is displaced, thereby correcting image blurring.

A zoom lens has been known wherein with a zoom lens having a four-group configuration consisting of first, second, third, and fourth lens units having positive, negative, positive, and positive refractive power in order from the object side to the image side, a part of the third lens unit is vibrated in the direction perpendicular to the optical axis, thereby obtaining a still image.

A zoom lens has been known wherein the third lens unit is divided into a lens unit having negative refractive power and a lens unit having positive refractive power, and the lens unit having positive refractive power is vibrated in the direction perpendicular to the optical axis, thereby obtaining a still image. For example, such a zoom lens has been described in Japanese Patent Laid-Open No. 7-128619, U.S. Pat. No. 6,473,231, Japanese Patent Laid-Open No. 2002-244037, and Japanese Patent Laid-Open No. 2003-322795.

In general, with a photographic system for stabilizing an image by subjecting a part of a lens unit of the photographic system to shift decentration, there is an advantage wherein there is no need to provide a particular optical system for stabilizing an image.

However, this also includes a problem wherein there is the need to provide space for a lens unit to be moved, and also a decentration aberration occurs at the time of image stabilizing.

In recent years, with video cameras, digital cameras, and so forth, there is a demand for a reduction in the overall size of the camera, while yielding a high quality image. Therefore, there is a demand for a zoom lens wherein decentration aberration can be minimized at the time of image stabilizing.

SUMMARY OF THE INVENTION

The present invention provides a zoom lens which can reduce occurrence of a decentration aberration when stabilizing an image by subjecting a lens unit to eccentricity so as to have components in the direction perpendicular to the optical axis, and exhibit excellent optical performance.

To this end, according to one aspect of the present invention, A zoom lens comprises, in order from the object side to the image side: a first lens unit having positive refractive power; a second lens unit having negative refractive power; a third lens unit having positive refractive power; and a fourth lens unit having positive refractive power; wherein the third lens unit consists of or includes, in order from the object side to the image side a 3a'th lens sub-unit having negative refractive power, and a 3b'th lens sub-unit having positive refractive power; and wherein the second lens unit and the fourth lens unit move on the optical axis during zooming; and wherein the 3b'th lens sub-unit moves in a direction perpendicular to the optical axis, thereby displacing an image in the direction perpendicular to the optical axis; and wherein the 3a'th lens sub-unit consists of or includes a negative lens element G3*an* both of whose major surfaces are spherical surfaces, and a positive lens element, both of whose both major surfaces are spherical surfaces; and wherein the 3b'th lens sub-unit consists of or includes a positive lens element G3*bp* having an aspherical lens surface, and a negative lens element; and wherein, when assuming that the indices of the materials of the negative lens element G3*an* and the positive lens element G3*bp* are NG3*an* and NG3*bp* respectively, a condition of 0.21<NG3*an*−NG3*bp* is satisfied.

Also, according to another aspect of the present invention, a zoom lens comprises, in order from the object side to the image side: a first lens unit having positive refractive power; a second lens unit having negative refractive power; a third lens unit having positive refractive power; and a fourth lens unit having positive refractive power; wherein the third lens unit consists of, in order from the object side to the image side a 3a'th lens sub-unit having negative refractive power, and a 3b'th lens sub-unit having positive refractive power; and wherein the second lens unit and the fourth lens unit move on the optical axis during zooming; and wherein the 3b'th lens sub-unit moves in a direction perpendicular to the optical axis, thereby displacing an image in the direction perpendicular to the optical axis; and wherein the 3b'th lens sub-unit consists of or includes a positive lens element G3*bp* including an aspherical lens surface, and a negative lens element; and wherein, when assuming that the index of the material of the positive lens element G3*bp* is NG3*bp*, and the index of the material of the positive lens element having the highest index of a material which is part of the fourth lens unit is NG4*p*, a condition of 0.07<NG4*p*−NG3*bp* is satisfied.

Also, according to another aspect of the present invention, a zoom lens comprises, in order from the object side to the image side: a first lens unit having positive refractive power; a second lens unit having negative refractive power; a third lens unit having positive refractive power; and a fourth lens unit having positive refractive power; wherein the third lens unit consists of, in order from the object side to the image side a 3a'th lens sub-unit having negative refractive power, and a 3b'th lens sub-unit having positive refractive power; and wherein the second lens unit and the fourth lens unit move on the optical axis during zooming; and wherein the first lens unit consists of or includes, in order from the object side to the image side a negative lens element G11, a positive lens element G12, a positive lens element G13, and a positive lens element G14; and wherein the 3a'th lens sub-unit whose lens elements are spherical lens elements; and wherein the 3b'th lens sub-unit consists of or includes a positive lens element having an aspherical lens surface, and a negative lens element; and wherein when assuming that the Abbe numbers of the materials of the positive lens element G12, positive lens element G13, and positive lens element G14 are vdG12, vdG13, and vdG14, the conditions 60.1<vdG12<75.1, 60.1<vdG13<75.1, 49.1<vdG14<60.1 are satisfied.

Also, according to another aspect of the present invention, an image pickup apparatus comprises: a solid-state image pickup element; and the zoom lens serving as one aspect of the present invention configured to form an image of a object on the solid-state image pickup element.

Further features of the present invention will become apparent from the following description of exemplary embodiments with reference to the attached drawings.

DESCRIPTION OF THE EMBODIMENTS

A zoom lens and an image pickup apparatus (digital still camera, video camera, etc.) according to the present invention will now be described. A requirement for a zoom lens according to the present invention is one of the following (i), (ii), and (iii).

(i) A zoom lens according to the present invention consisting of or including, in order from the object side to the image side:
a first lens unit having positive refractive power;
a second lens unit having negative refractive power;
a third lens unit having positive refractive power; and
a fourth lens unit having positive refractive power;
wherein the third lens unit consists of or includes, in order from the object side to the image side a 3a'th lens sub-unit (a first lens subunit) having negative refractive power, and
a 3b'th lens sub-unit (a second lens subunit) having positive refractive power;
and wherein the second lens unit and the fourth lens unit move on the optical axis during zooming (at the time of zooming);
wherein the 3b'th lens sub-unit moves in a direction (having a component in the direction) perpendicular to the optical axis, thereby displacing an image in the direction perpendicular to the optical axis;
and wherein the 3a'th lens sub-unit consists of
a negative lens element G3$an$ both of whose major surfaces have a spherical shape, and
a positive lens element both of whose major surfaces have a spherical shape;
and wherein the 3b'th lens sub-unit includes
a positive lens element G3$bp$ including an aspherical lens surface, and
a negative lens element;
and wherein, when assuming that the indices of the materials of the negative lens element G3$an$ and the positive lens element G3$bp$ are NG3$an$ and NG3$bp$ respectively, a condition of $$0.21 < NG3an - NG3bp \quad (1)$$

is satisfied.

(ii) A zoom lens according to the present invention consisting of or including, in order from the object side to the image side:
a first lens unit having positive refractive power;
a second lens unit having negative refractive power;
a third lens unit having positive refractive power; and
a fourth lens unit having positive refractive power;
wherein the third lens unit consists of, in order from the object side to the image side,
a 3a'th lens sub-unit having negative refractive power, and
a 3b'th lens sub-unit having positive refractive power;
and wherein the second lens unit and the fourth lens unit move on the optical axis during zooming;
and wherein the 3b'th lens sub-unit moves in a direction (having a component in the direction) perpendicular to the optical axis, thereby displacing an image in the direction perpendicular to the optical axis;
and wherein the 3b'th lens sub-unit includes
a positive lens element G3$bp$ including an aspherical lens surface, and
a negative lens element;
and wherein, when assuming that the index of the material of the positive lens element G3$bp$ is NG3$bp$, and the index of the material of a positive lens element having the highest refractive index in the fourth lens unit is NG4$p$, a condition of $$0.07 < NG4p - NG3bp \quad (2)$$

is satisfied.

(iii) A zoom lens according to the present invention consisting of or including, in order from the object side to the image side:
a first lens unit having positive refractive power;
a second lens unit having negative refractive power;
a third lens unit having positive refractive power; and
a fourth lens unit having positive refractive power;
wherein the third lens unit consists of or includes, in order from the object side to the image side,
a 3a'th lens sub-unit having negative refractive power, and
a 3b'th lens sub-unit having positive refractive power;

and wherein the second lens unit and the fourth lens unit move on the optical axis during zooming;

and wherein the first lens unit consists of or includes, in order from the object side to the image side, a negative lens element G11,
a positive lens element G12,
a positive lens element G13, and
a positive lens element G14;

and wherein the 3a'th lens sub-unit has lens elements which are spherical lens elements;

and wherein the 3b'th lens sub-unit consists of or includes
a positive lens element including an aspherical lens surface, and
a negative lens element;

and wherein, when assuming that the Abbe numbers of the materials of the positive lens element G12, positive lens element G13, and positive lens element G14 are vdG12, vdG13, and vdG14, conditions of $$60.1 < vdG12 < 75.1 \quad (3)$$

$$60.1 < vdG13 < 75.1 \quad (4)$$

$$49.1 < vdG14 < 60.1 \quad (5)$$

are satisfied.

With a zoom lens according to the present embodiment, at least any one of the above-mentioned zoom lenses of (i), (ii), and (iii) is taken as a necessary requirement. In other words, as long as a zoom lens is one of the above-mentioned zoom lenses of (i), (ii), and (iii), the problems of the present invention can be solved, so a requirement not particularly described in (i), (ii), and (iii) is not an indispensable requirement in order to solve the problems.

Description will be made below regarding a specific example of a zoom lens and an image pickup apparatus according to the present embodiment with reference to the drawings.

First Embodiment

Description will be made below regarding a zoom lens according to the present embodiment, and an embodiment of an image pickup apparatus including the zoom lens thereof with reference to the drawings.

Figure 1:
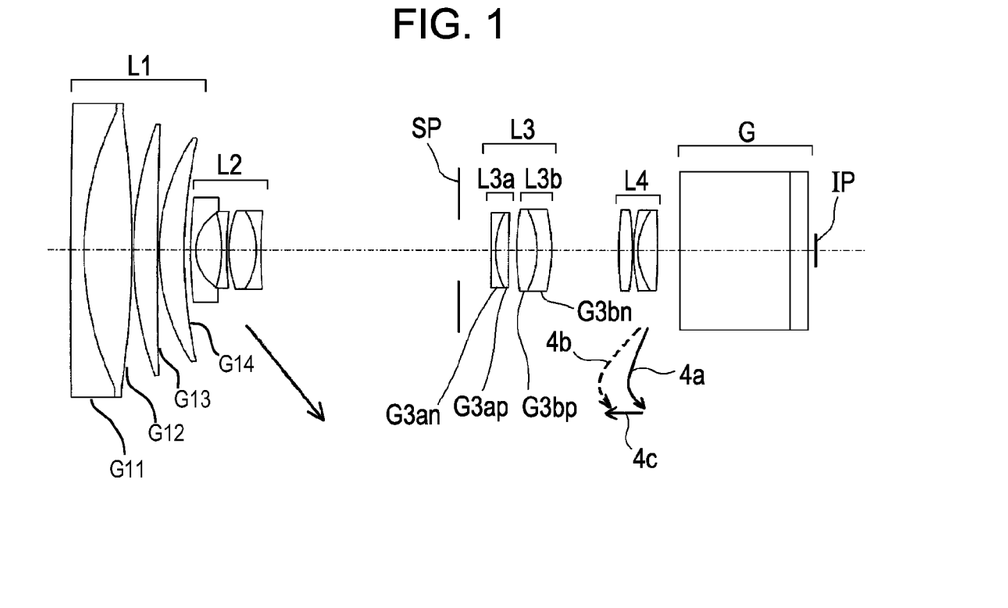
FIG. 1 is a cross-sectional view of a lens at the wide angle end of a zoom lens according to a first embodiment.
Figure 2:
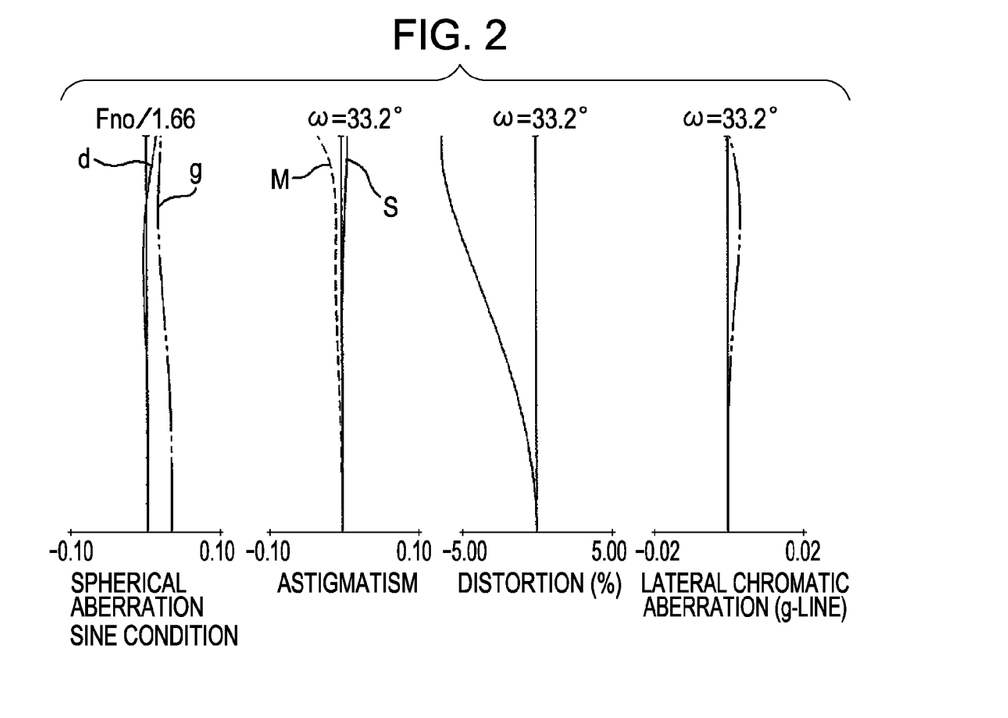
FIG. 2 is a chart illustrating various aberrations at the wide angle end of the zoom range of a zoom lens according to the first embodiment.
Figure 3:
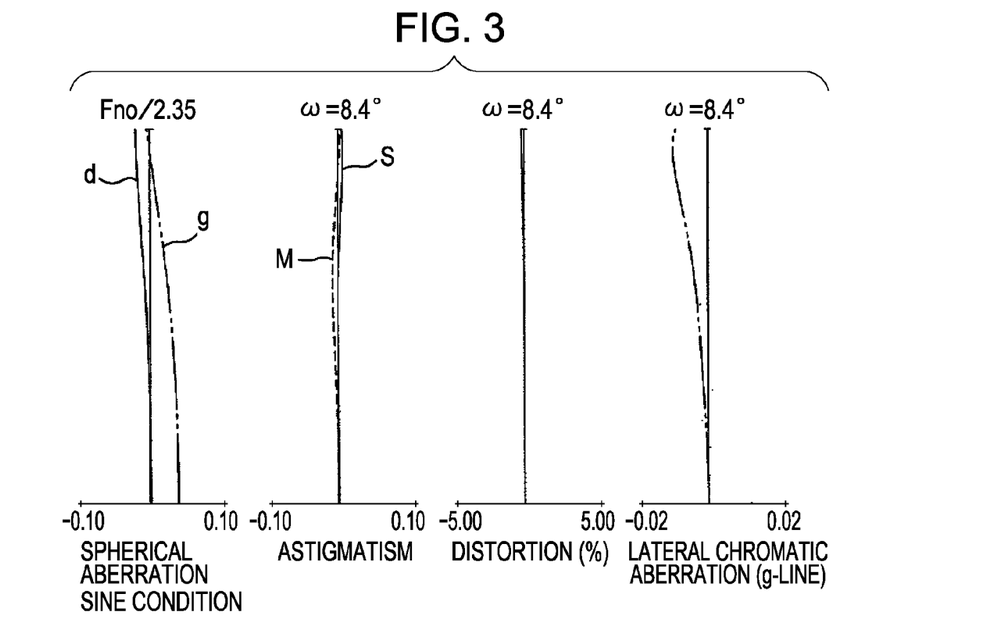
FIG. 3 is a chart illustrating various aberrations at the mid-zoom position of the zoom lens according to the first embodiment.
Figure 4:
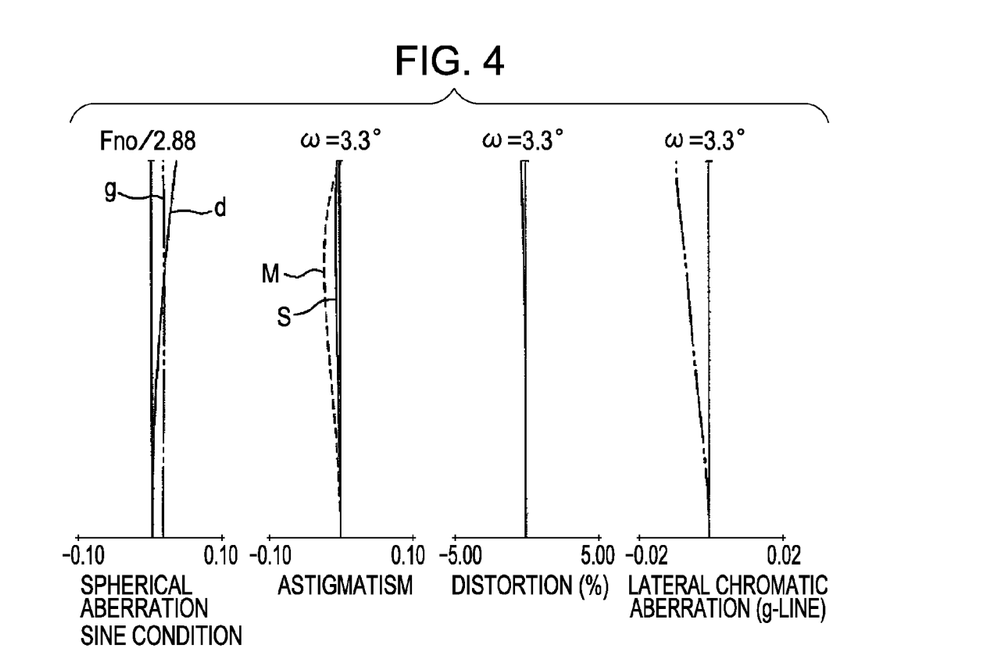
FIG. 4 is a chart illustrating various aberrations at the telephoto end of the zoom range of a zoom lens according to the first embodiment.

FIG. 1 is a cross-sectional view of a zoom lens according to a first embodiment at the wide angle end of its zoom range, and FIG. 2, FIG. 3, and FIG. 4 are aberration charts at the wide angle end, the position in the middle, and the telephoto end of the zoom range according to the first embodiment when focusing on an object at infinity.

Figure 5:
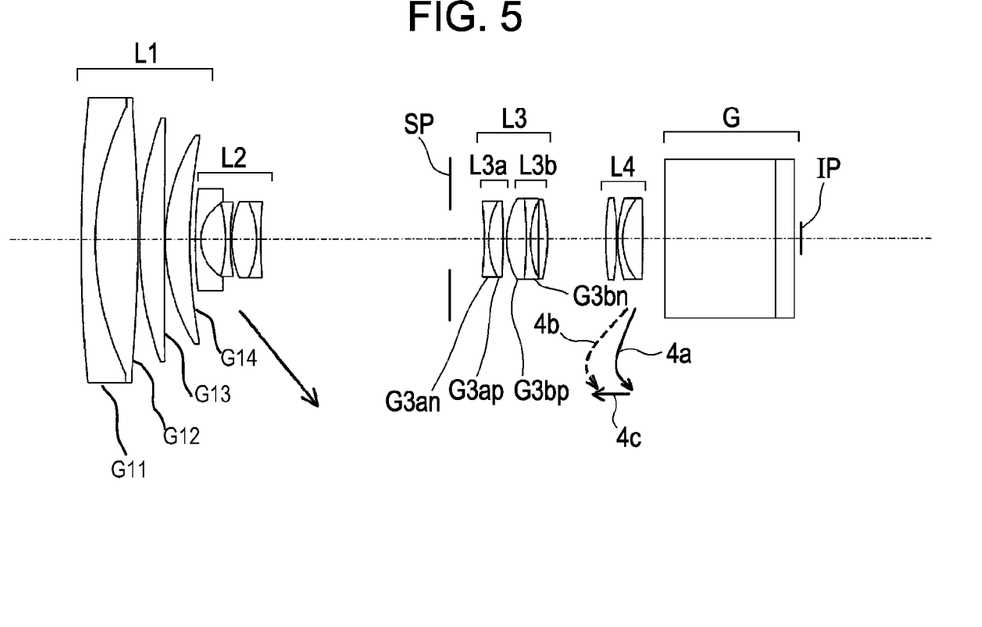
FIG. 5 is a cross-sectional view of a lens at the wide angle end of a zoom range of a zoom lens according to a second embodiment.
Figure 6:
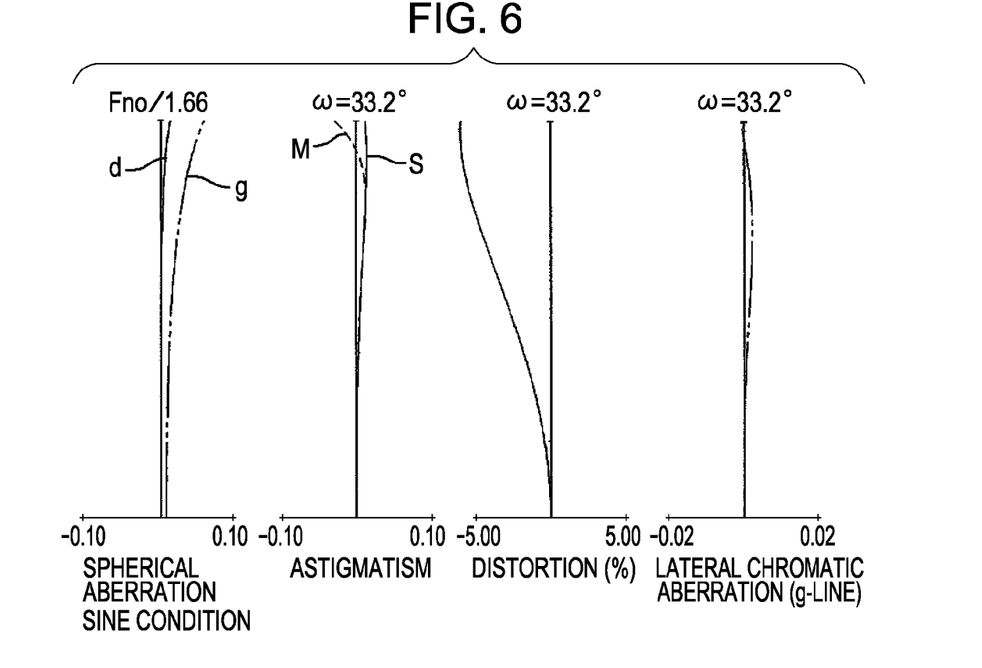
FIG. 6 is a chart illustrating various aberrations at the wide angle end of the zoom range of a zoom lens according to the second embodiment.
Figure 7:
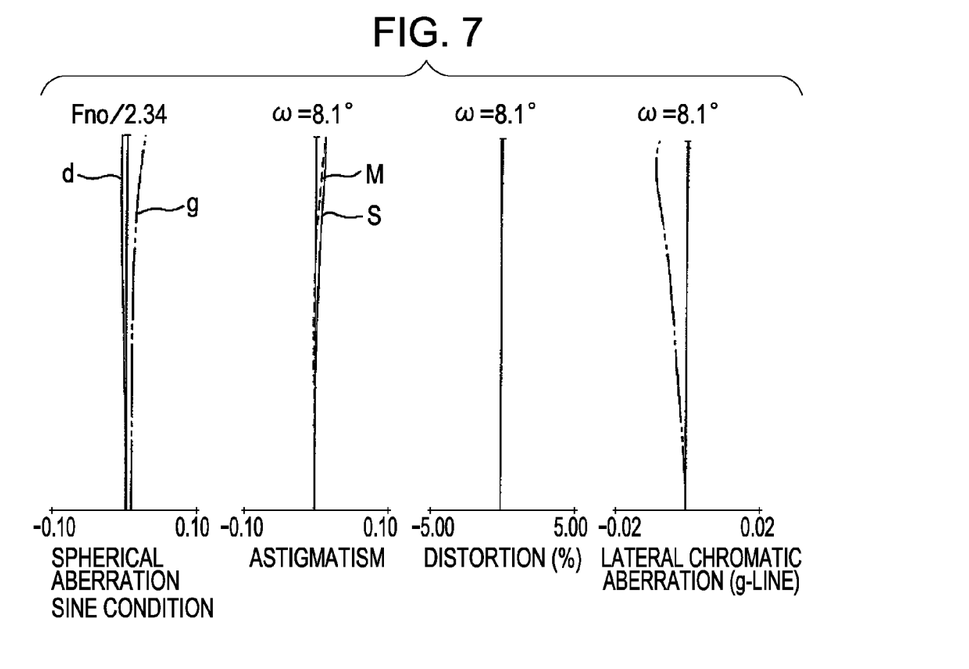
FIG. 7 is a chart illustrating various aberrations at the mid-zoom position of the zoom lens according to the second embodiment.
Figure 8:
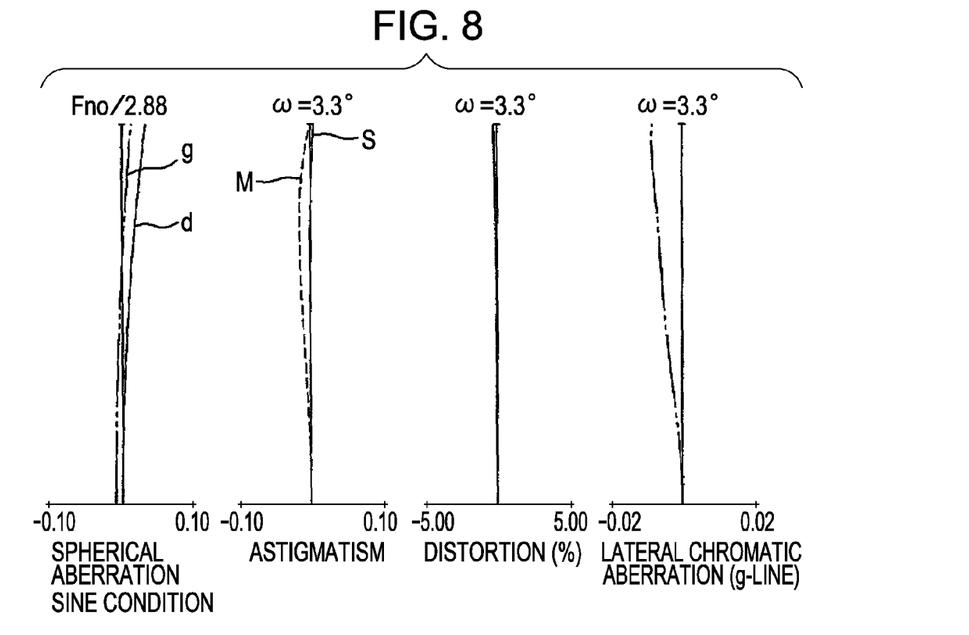
FIG. 8 is a chart illustrating various aberrations at the telephoto end of the zoom range of a zoom lens according to the second embodiment.

FIG. 5 is a cross-sectional view of a zoom lens at the wide angle end of the zoom range according to a second embodiment, and FIGS. 6 through 8 are aberration charts at the wide angle end, the position in the middle, and the telephoto end of the zoom range according to the second embodiment when focusing on an object at infinity.

Figure 9:
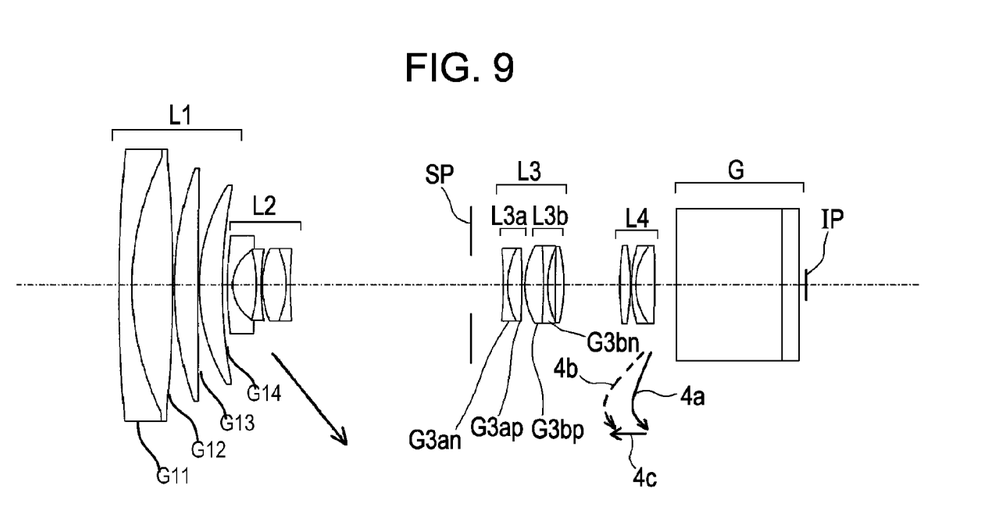
FIG. 9 is a cross-sectional view of a lens at the wide angle end of the zoom range of a zoom lens according to a third embodiment.
Figure 10:
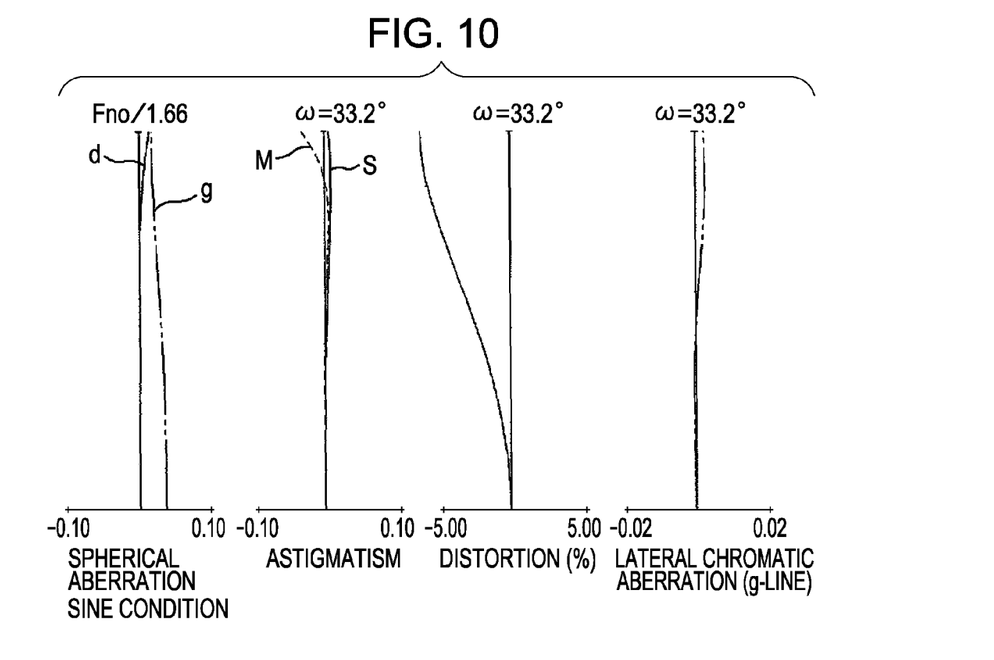
FIG. 10 is a chart illustrating various aberrations at the wide angle end of the zoom range of a zoom lens according to the third embodiment.
Figure 11:
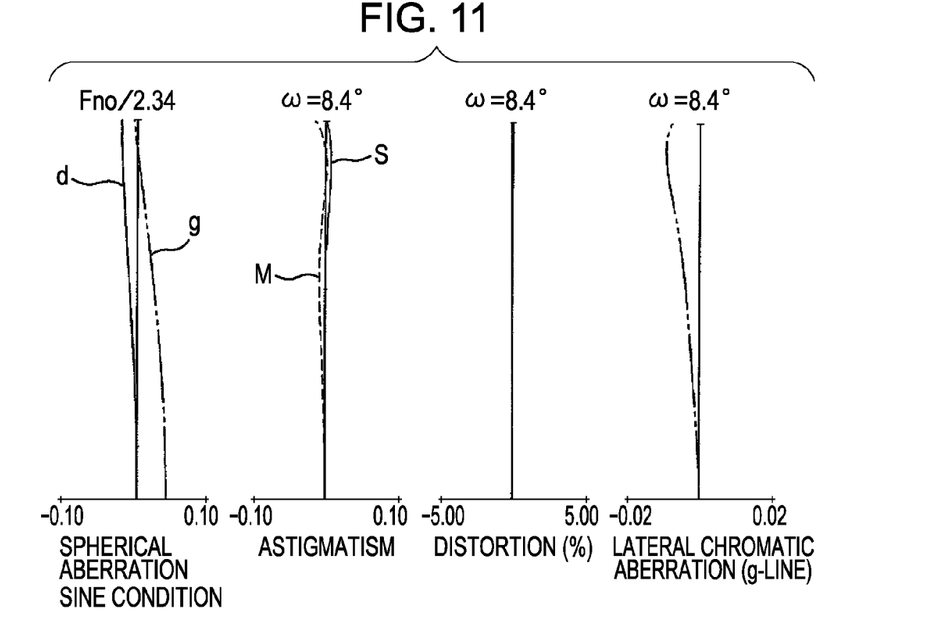
FIG. 11 is a chart illustrating various aberrations at the mid-zoom position of the zoom lens according to the third embodiment.
Figure 12:
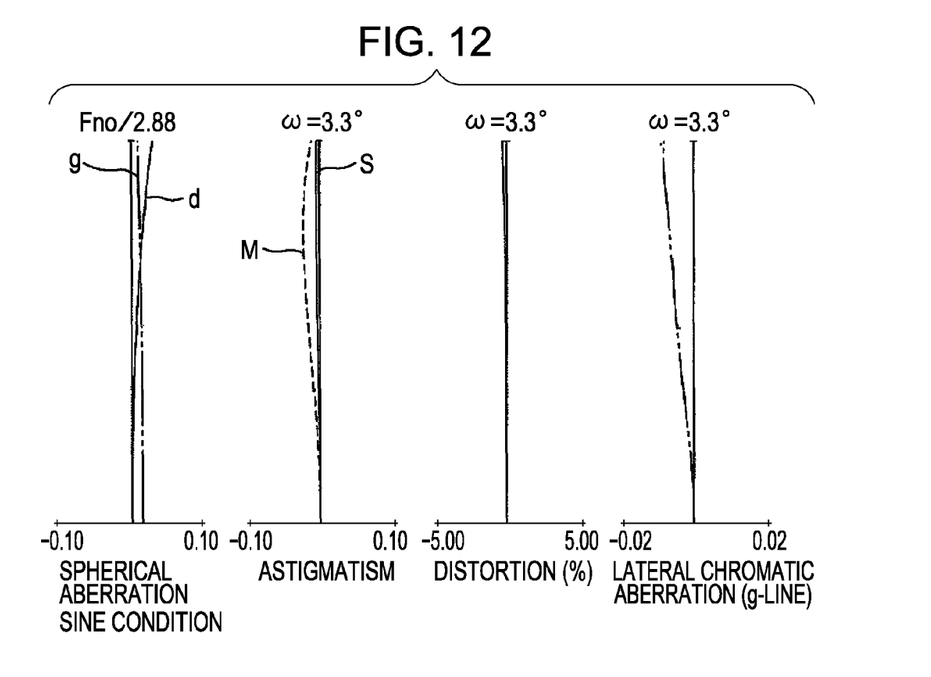
FIG. 12 is a chart illustrating various aberrations at the telephoto end of the zoom range of a zoom lens according to the third embodiment.

FIG. 9 is a cross-sectional view of a zoom lens at the wide angle end of the zoom range according to a third embodiment, and FIGS. 10 through 12 are aberration charts at the wide angle end, the position in the middle, and the telephoto end of the zoom range according to the third embodiment when focusing on an object at infinity.

Figure 13:
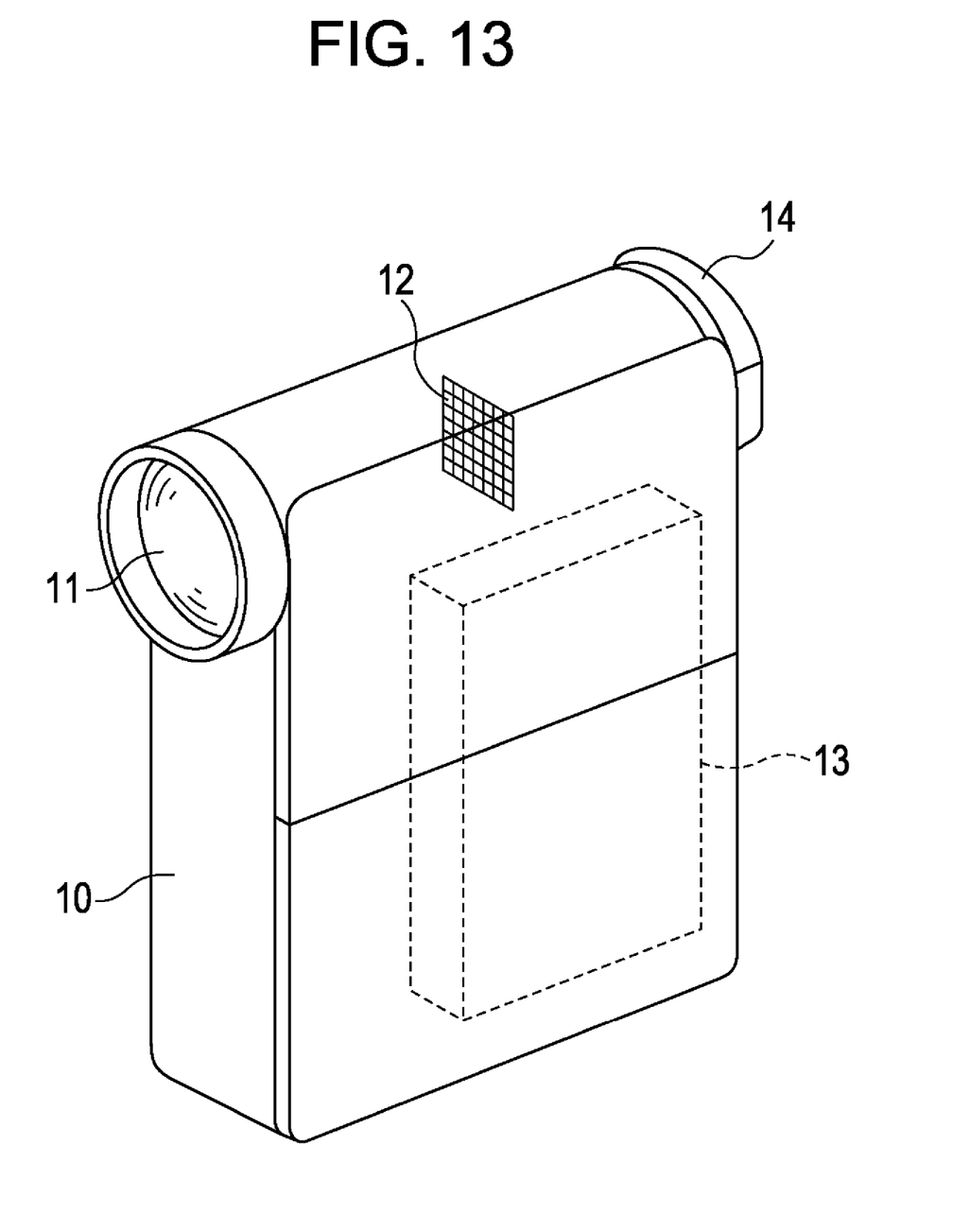
FIG. 13 is a principal-component schematic diagram of an image pickup apparatus according to the present invention.

FIG. 13 is a principal components schematic diagram of a video camera (image pickup apparatus) including a zoom lens according to the present invention.

With the cross-sectional view of a lens shown in FIGS. 1, 5, and 9, L1 denotes a first lens unit having positive refractive power (optical power=the inverse number of a focal length), L2 denotes a second lens unit having negative refractive power, L3 denotes a third lens unit having positive refractive power, and L4 denotes a fourth lens unit having positive refractive power.

The third lens unit L3 consists of or includes a 3a'th lens unit (a first lens subunit) L3a having negative refractive power, and a 3b'th lens unit (a second lens subunit) L3b having positive refractive power which moves in a direction (having a component in the direction) perpendicular to the optical axis for image stabilizing (for regulating the displacement of an image). Note that as for movement for image stabilizing, oscillating (rotational movement) centered on a certain rotational point on the optical axis may be employed. The 3b'th lens unit L3b for image stabilizing is moved in a direction having a component in the direction perpendicular to the optical axis. Now, it is sufficient for the 3b'th lens unit L3b to move in a direction which is only slightly perpendicular to the direction of the optical axis, i.e., it is sufficient that the direction in which the 3b'th lens unit L3b moves has a component perpendicular to the optical axis. More specifically, the direction in which the 3b'th lens unit L3b moves may be either the direction perpendicular to the optical axis or the direction oblique to the optical axis, as long as the image can be moved in a direction perpendicular to the optical axis within the image plane.

Reference symbol G denotes an optical block equivalent to an optical filter, face plate, or the like. IP denotes an image plane, and when employing as the photographic optical system of a video camera or digital still camera, the imaging plane of a solid-state image pickup element (photoelectric conversion element) such as a CCD sensor, CMOS sensor, or the like is equivalent to this image plane IP, and when employing as a camera for silver-halide film, the film plane is equivalent to this image plane IP. In other words, an image of an object is formed on the imaging plane (on the solid-state image pickup element or film plane) using the photoelectric optical system. Also, SP denotes an aperture stop, which is provided at the object side of the 3a'th lens unit L3a.

With the aberration charts, d represents a d-line, g represents a g-line, M represents a meridional image plane, S represents a sagittal image plane, and a lateral chromatic aberration is represented with a g-line. Fno denotes an F-stop, and ω denotes a half-field angle. Note that with the following respective embodiments, the zoom positions of the wide angle end and telephoto end mean the zoom position where a lens unit for zooming (the second lens unit L2 with each of the embodiments) is positioned at respective ends of a range mechanically movable on the optical axis.

With the respective embodiments, in the event of zooming from the wide angle end to the telephoto end, the second lens unit L2 is moved to the image side to perform zooming, and also variation in the image plane along with zooming is corrected by moving the fourth lens unit L4 to the object side on part of a convex-shaped locus.

Also, a rear focus method is employed wherein the fourth lens unit L4 is moved on the optical axis to perform focusing. A solid-line curve 4a and a dotted-line curve 4b of the fourth lens unit L4 are each movement loci for correcting the variation in the image plane in the event of zooming from the wide angle end to the telephoto end when focusing on an infinite-distance object and a short-distance object respectively.

Thus, the fourth lens unit L4 is arranged so as to assume a convex-shaped locus toward the object side, whereby effective use of the space between the third lens unit L3 and the fourth lens unit L4 is realized, and consequently, reduction in the full lens length is effectively achieved. Note that the first lens unit L1 and the third lens unit L3 are immovable for zooming and focusing.

With the respective embodiments, for example, focusing from an object at infinity to a short-distance object at the zoom position of the telephoto end is performed by the fourth lens unit L4 being moved forward such as shown with an arrow 4c.

With the respective embodiments, an arrangement is made wherein image blurring when the entire optical system is vibrated is corrected by moving the 3b'th lens sub-unit (image stabilizing lens unit) L3b in a direction having a component in a direction perpendicular to the optical axis. The 3b'th lens sub-unit L3b is moved in a direction having a component in a direction perpendicular to the optical axis, i.e., the direction perpendicular to the optical axis, or a direction inclined (oblique) to the optical axis, whereby movement within the image plane can be performed, and consequently, image stabilizing can be performed. Thus, image stabilizing can be performed without adding an optical member such as a variable vertex angle prism or the like, and a lens unit for image stabilizing, and consequently, an increase in the size of the entire optical system is prevented. With the respective embodiments, the first lens unit L1 consists of a negative lens element G11, a biconvex-shaped positive lens element G12, a positive lens element G13 whose object side is a convex surface, and a meniscus-shaped positive lens element G14 whose object side is a convex surface, in order from the object side to the image side.

The negative lens element G11 and the positive lens element G12 are joined.

The second lens unit L2 consists of a meniscus-shaped negative lens element whose image side is a concave surface, a negative lens element whose object side is a concave surface, a biconvex-shaped positive lens element, and a biconcave-shaped negative lens element, in order from the object side to the image side. According to such a lens configuration, the second lens unit L2 reduces variation in aberrations when zooming.

The third lens unit L3 consists of a 3a'th lens sub-unit having negative refractive power, and a 3b'th lens sub-unit having positive refractive power in order from the object side to the image side. Thus, back focus having a sufficient length is secured.

Also, the 3a'th lens sub-unit L3a consists of a negative lens element G3an, and a positive lens element G3ap in order from the object side to the image side. The absolute value of refractive power of the image side surface of the negative lens element G3an is larger (stronger) than that of the object side surface. Both surfaces are spherical surfaces. The absolute value of refractive power of the object side surface of the positive lens element G3ap is larger (stronger) than that of the image side surface. Both surfaces are spherical surfaces. Note that here, refractive power is the reciprocal of focal distance.

The negative lens element G3an and the positive lens element G3ap are joined.

With the first embodiment, the 3b'th lens sub-unit L3b consists of a positive lens element G3bp including an aspherical lens surface, and a negative lens element G3bn.

In the second and third embodiments, the 3b'th lens sub-unit L3b consists of a positive lens element G3bp including an aspherical lens surface, a negative lens element G3bn, and a positive lens element.

As described above, the 3b'th lens sub-unit L3b is configured so as to include or consist of a positive lens element including an aspherical surface and a negative lens element, thereby preventing optical performance at the time of image stabilizing correction from deteriorating.

Also, the 3a'th lens sub-unit L3a consists of a negative lens element and a positive lens element, whereby a longitudinal chromatic aberration can be improved, and also both lens elements are made up of a spherical lens, thereby facilitating manufacturing thereof.

The fourth lens unit L4 consists of or includes a biconvex-shaped positive lens element, a meniscus-shaped negative lens element whose object side is a convex surface, and a positive lens element whose object side is a convex surface. Thus, variation in aberrations when focusing is reduced.

With the respective embodiments, an arrangement is made wherein one or more of the conditions specified next are satisfied. Thus, an advantage equivalent to each condition is obtained.

Now, let us say that the refractive indices of the materials of the negative lens element G3an and the positive lens element G3bp which are from the third lens unit L3 are NG3an and NG3bp respectively. Let us also say that with the positive lens elements which are from the fourth lens unit L4, the highest index of the material indices is NG4p. Let us further say that the Abbe numbers of the materials of the positive lens element G12, positive lens element G13, and positive lens element G14 which are among the first lens unit L1 are vdG12, vdG13, and vdG14 in order. Let us moreover say that the curvature radii of the lens surfaces at the object side and image side of the negative lens element G3an which is from the 3a'th lens sub-unit L3a are RG3an1 and RG3an2 respectively.

At this time, an arrangement is made wherein one or more of the following conditions are satisfied:

$$0.21 < NG3an - NG3bp \tag{1}$$

$$0.07 < NG4p - NG3bp \tag{2}$$

$$60.1 < vdG12 < 75.1 \tag{3}$$

$$60.1 < vdG13 < 75.1 \tag{4}$$

$$49.1 < vdG14 < 60.1 \tag{5}$$

$$-1.0 < RG3an2/RG3an1 < 0.1 \tag{6}$$

Next, description will be made regarding the technical implications of the above-mentioned conditional expressions.

Conditional expression (1) relates to the difference between the refractive index of the material of the negative lens element G3an which is part of the 3a'th lens sub-unit L3a and the refractive index of the material of the positive lens element G3bp of the 3b'th lens sub-unit L3b.

In the event of exceeding the lower limit of Conditional expression (1), upon the index of the material of the negative lens element G3an becoming low, or the index of the material of the positive lens element G3bp becoming high, the curvature of field exhibits overcorrection. In order to correct the curvature of field exhibiting overcorrection, for example, with the 3a'th lens sub-unit L3a, there is the need to employ an aspherical lens element, which consequently makes it difficult to manufacture.

Setting the lower limit of Conditional expression (1) to 0.25 is desirable to make the curvature of field flat. Setting the lower limit of Conditional expression (1) to 0.29 is further desirable. Also, too high an index of the material of the negative lens element G3an makes it difficult to perform processing and manufacturing, so it is desirable to set the upper limit of Conditional expression (1) to 0.51.

Conditional expression (2) relates to the difference between the refractive index of the material of the positive lens element G3bp which is part of the 3b'th lens sub-unit L3b and the index of the material of the positive lens element having the highest index of a material of the positive lens elements which comprise the fourth lens unit L4.

In the event of exceeding the lower limit of Conditional expression (2), upon the index of the material of the positive lens element G4p becoming low, or the index of the material of the positive lens element G3bp becoming high, the curvature of field exhibits undercorrection. In order to correct the curvature of field exhibiting undercorrection, with the fourth lens unit L4 also, there is the need to employ an aspherical lens element.

Consequently, employing an aspherical lens element makes it difficult to manufacture. Setting to the lower limit of Conditional expression (2) to 0.105 is desirable to make the image plane flat.

Also, upon the index of the material of the positive lens element G4p which is among the fourth lens unit L4 becoming high, the material thereof becomes a low-dispersion material, which makes it difficult to perform correction of a lateral chromatic aberration at the wide angle end, so it is desirable to set the upper limit of Conditional expression (2) to 0.19.

Conditional expressions (3), (4), and (5) relate to the Abbe numbers of the materials of the positive lens elements G12, G13, and G14 which are part of the first lens unit L1.

Exceeding the lower limits of the respective conditional expressions makes it difficult to improve longitudinal chromatic aberration and lateral chromatic aberration. Also, exceeding the upper limits of the respective conditional expressions makes the relevant material a low-dispersion material, and also makes the index low, which consequently makes it difficult to perform correction of a spherical aberration.

It is further desirable to set Conditional expressions (3), (4), and (5) to the following numerical ranges.

$$62 < vdG12 < 70 \quad (3a)$$

$$60.3 < vdG13 < 70 \quad (4a)$$

$$49.3 < vdG14 < 56 \quad (5a)$$

Conventional expression (6) relates to the lens shape of the negative lens element G3an which is part of the 3a'th lens sub-unit L3a.

Exceeding the lower limit of Conditional expression (6) makes the convex surface of the lens surface at the object side of the negative lens element G3an more curved. Consequently, in order to avoid interference with the aperture SP disposed at the object side of the 3a'th lens unit L3a, the distance between the aperture SP and the 3a'th lens unit L3a becomes larger.

At this time, the gap between the aperture SP and the 3b'th lens unit L3b also becomes larger, the lens diameter of the 3b'th lens unit L3b increases, and also the weight increases.

Consequently, a driving device for driving the 3b'th lens sub-unit L3b becomes large in size due to correction of blurring, which is not desirable.

It is further desirable to set the lower limit value of Conditional expression (6) to −0.50, or preferably to −0.25. Exceeding the upper limit value of Conditional expression (6) makes the negative refractive power of the negative lens element G3ann weak, or makes the positive refractive power strong, and consequently makes it difficult to secure a long back focus, which is undesirable. It is desirable to set the upper limit value to 0.08.

Note that with the respective embodiments, a lens unit having small refractive power may be added at the object side of the first lens unit L1, or at the image side of the fourth lens unit L4. Also, a teleconverter lens, a wide converter lens, or the like may be disposed at the object side or image side.

As described above, according to the respective embodiments, the arrangement of refractive power of each lens unit, the lens configuration of each lens unit are appropriately set, and also the relatively small light-weight 3b'th lens sub-unit making up a part of the third lens unit L3 is taken as an image stabilizing lens unit. Subsequently, the 3b'th lens sub-unit is moved in a direction having a component in the direction perpendicular to the optical axis, thereby correcting the blurring of an image when the zoom lens is vibrated (tilted). Thus, a zoom lens can be obtained wherein reduction in size of the entire optical system, mechanical simplification, and reduction in load of a driving device are realized, and also the aberration due to eccentricity at the time of subjecting the relevant lens unit to eccentricity is appropriately corrected.

First through third numerical examples corresponding to the first through third embodiments are shown below. With the respective numerical examples, i denotes the order number of a plane from the object side, ri denotes a i'th (i'th plane) curvature radius, di denotes the interval with the i'th plane+1 plane, and ni and vi each denote an index and Abbe number with a d-line as reference.

Also, with the first through third numerical examples, three planes at the most image side are planes equivalent to an optical block. With an aspherical shape, when assuming that the displacement in the optical axis direction at the position of a height H from the optical axis is X with a plane peak as reference, X can be represented as follows.

$$x = \frac{(1/R)h^2}{1 + \sqrt{\{1 - (1+k)(h/R)^2\}}} + Bh^4 + Ch^6 + Dh^8 + Eh^{10} + Fh^{12}$$

wherein R represents a paraxial curvature radius, k represents a cone constant, and B, C, D, E, and F represent aspherical coefficients. Also, "e-X" means "×10⁻ˣ", f represents focal length, FNo represents the f-stop, and ω represents a half-field angle.

Also, the relations between the above-mentioned respective conditional expressions and the various numeric values in the numerical embodiments are shown in Table 1.

[First Numerical Embodiment]
f = 4.59~52.60 FNo = 1: 1.66~2.88 2ω = 66.4°~6.5°

| | | | |
|---|---|---|---|
| r1 = 1340.134 | d1 = 2.65 | n1 = 1.80518 | v1 = 25.4 |
| r2 = 63.184 | d2 = 9.00 | n2 = 1.51633 | v2 = 64.1 |
| r3 = −185.115 | d3 = 0.25 | | |
| r4 = 71.527 | d4 = 4.65 | n3 = 1.60311 | v3 = 60.6 |
| r5 = 833.988 | d5 = 0.25 | | |
| r6 = 40.112 | d6 = 4.85 | n4 = 1.77250 | v4 = 49.6 |

-continued

[First Numerical Embodiment]
f = 4.59~52.60 FNo = 1: 1.66~2.88 2ω = 66.4°~6.5°

| | | | |
|---|---|---|---|
| r7 = 98.483 | d7 = variable | | |
| r8 = 75.414 | d8 = 1.05 | n5 = 1.83481 | ν5 = 42.7 |
| r9 = 8.460 | d9 = 4.96 | | |
| r10 = −25.708 | d10 = 0.95 | n6 = 1.88300 | ν6 = 40.8 |
| r11 = 70.356 | d11 = 0.45 | | |
| r12 = 21.114 | d12 = 5.25 | n7 = 1.76182 | ν7 = 26.5 |
| r13 = −14.267 | d13 = 0.80 | n8 = 1.66672 | ν8 = 48.3 |
| r14 = 75.081 | d14 = variable | | |
| r15 = ∞ (aperture) | d15 = 6.17 | | |
| r16 = −20243.348 | d16 = 0.75 | n9 = 1.88300 | ν9 = 40.8 |
| r17 = 15.928 | d17 = 2.61 | n10 = 1.80518 | ν10 = 25.4 |
| r18 = 469.626 | d18 = 1.49 | | |
| r19 = 45.809 (aspheric surface) | d19 = 3.90 | n11 = 1.58313 | ν11 = 59.4 |
| r20 = −18.179 | d20 = 2.80 | n12 = 1.84666 | ν12 = 23.9 |
| r21 = −33.982 | d21 = variable | | |
| r22 = 69.921 | d22 = 2.65 | n13 = 1.60311 | ν13 = 60.6 |
| r23 = −53.106 | d23 = 0.20 | | |
| r24 = 31.586 | d24 = 0.85 | n14 = 1.84666 | ν14 = 23.9 |
| r25 = 13.510 | d25 = 3.80 | n15 = 1.69680 | ν15 = 55.5 |
| r26 = −140.727 | d26 = variable | | |
| r27 = ∞ | d27 = 21.00 | n16 = 1.70154 | ν16 = 41.2 |
| r28 = ∞ | d28 = 3.50 | n17 = 1.51633 | ν17 = 64.1 |
| r29 = ∞ | | | |

| | focal length | | |
|---|---|---|---|
| variable interval | 4.59 | 20.36 | 52.60 |
| d7 | 1.05 | 26.17 | 34.55 |
| d14 | 37.53 | 12.40 | 4.03 |
| d21 | 12.76 | 9.49 | 10.92 |
| d26 | 4.10 | 7.37 | 5.94 | aspherical coefficient
19'th plane

| K | B | C | D | E | F |
|---|---|---|---|---|---|
| −3.3658e+00 | −5.4734e−06 | 2.4831e−08 | 8.8135e−11 | −1.1844e−11 | 1.27575e−13 |

[Second Numerical Embodiment]
f = 4.59~52.67 FNo = 1: 1.66~2.88 2ω = 66.3°~6.5°

| | | | |
|---|---|---|---|
| r1 = 295.928 | d1 = 2.60 | n1 = 1.80518 | ν1 = 25.4 |
| r2 = 59.627 | d2 = 8.11 | n2 = 1.51633 | ν2 = 64.1 |
| r3 = −282.336 | d3 = 0.25 | | |
| r4 = 71.901 | d4 = 4.63 | n3 = 1.51633 | ν3 = 64.1 |
| r5 = 1486.913 | d5 = 0.25 | | |
| r6 = 38.706 | d6 = 4.58 | n4 = 1.71300 | ν4 = 53.9 |
| r7 = 101.899 | d7 = variable | | |
| r8 = 82.791 | d8 = 1.05 | n5 = 1.83481 | ν5 = 42.7 |
| r9 = 8.372 | d9 = 4.72 | | |
| r10 = −27.366 | d10 = 0.95 | n6 = 1.88300 | ν6 = 40.8 |
| r11 = 54.055 | d11 = 0.21 | | |
| r12 = 18.806 | d12 = 4.74 | n7 = 1.80518 | ν7 = 25.4 |
| r13 = −18.806 | d13 = 0.80 | n8 = 1.77250 | ν8 = 49.6 |
| r14 = 84.755 | d14 = variable | | |
| r15 = ∞ (aperture) | d15 = 6.50 | | |
| r16 = −69.575 | d16 = 0.75 | n9 = 1.88300 | ν9 = 40.8 |
| r17 = 16.732 | d17 = 2.87 | n10 = 1.80518 | ν10 = 25.4 |
| r18 = −128.596 | d18 = 0.5 | | |
| r19 = 15.189 (aspheric surface) | d19 = 3.82 | n11 = 1.58313 | ν11 = 59.4 |
| r20 = −89.423 | d20 = 0.75 | n12 = 1.69895 | ν12 = 30.1 |
| r21 = 20.212 | d21 = 1.40 | | |
| r22 = 540.329 | d22 = 1.77 | n13 = 1.66672 | ν13 = 48.3 |
| r23 = −34.259 | d23 = variable | | |
| r24 = 51.983 | d24 = 2.14 | n14 = 1.60311 | ν14 = 60.6 |
| r25 = −51.983 | d25 = 0.20 | | |
| r26 = 28.582 | d26 = 0.85 | n15 = 1.84666 | ν15 = 23.9 |
| r27 = 13.065 | d27 = 3.83 | n16 = 1.69680 | ν16 = 55.5 |
| r28 = −316.875 | d28 = variable | | |

-continued

[Second Numerical Embodiment]
f = 4.59~52.67  FNo = 1: 1.66~2.88  2ω = 66.3°~6.5°

| | | | |
|---|---|---|---|
| r29 = ∞ | d29 = 21.00 | n17 = 1.70154 | ν17 = 41.2 |
| r30 = ∞ | d30 = 3.50 | n18 = 1.51633 | ν18 = 64.1 |
| r31 = ∞ | | | |

| | focal length | | |
|---|---|---|---|
| variable interval | 4.59 | 21.10 | 52.67 |
| d7 | 1.09 | 26.21 | 34.59 |
| d14 | 35.86 | 10.73 | 2.36 |
| d23 | 11.13 | 7.11 | 7.89 |
| d28 | 4.19 | 8.20 | 7.42 | aspherical coefficient
19'th plane

| K | B | C | D | E | F |
|---|---|---|---|---|---|
| −8.1330e−01 | −4.7575e−06 | 5.7128e−08 | −2.7963e−10 | 5.6007e−12 | −3.81256e−14 |

[Third Numerical Embodiment]
f = 4.59~52.63  FNo = 1: 1.66~2.88  2ω = 66.4°~6.5°

| | | | |
|---|---|---|---|
| r1 = 426.818 | d1 = 2.65 | n1 = 1.80518 | ν1 = 25.4 |
| r2 = 58.430 | d2 = 8.68 | n2 = 1.51633 | ν2 = 64.1 |
| r3 = −260.152 | d3 = 0.25 | | |
| r4 = 66.062 | d4 = 4.66 | n3 = 1.60311 | ν3 = 60.6 |
| r5 = 459.385 | d5 = 0.25 | | |
| r6 = 41.482 | d6 = 4.70 | n4 = 1.77250 | ν4 = 49.6 |
| r7 = 105.595 | d7 = variable | | |
| r8 = 77.766 | d8 = 1.05 | n5 = 1.83481 | ν5 = 42.7 |
| r9 = 8.370 | d9 = 4.95 | | |
| r10 = −25.060 | d10 = 0.95 | n6 = 1.88300 | ν6 = 40.8 |
| r11 = 73.740 | d11 = 0.31 | | |
| r12 = 20.394 | d12 = 5.23 | n7 = 1.76182 | ν7 = 26.5 |
| r13 = −14.024 | d13 = 0.80 | n8 = 1.66672 | ν8 = 48.3 |
| r14 = 68.227 | d14 = variable | | |
| r15 = ∞ (aperture) | d15 = 6.11 | | |
| r16 = 375.114 | d16 = 0.75 | n9 = 1.88300 | ν9 = 40.8 |
| r17 = 16.994 | d17 = 2.39 | n10 = 1.80518 | ν10 = 25.4 |
| r18 = 233.657 | d18 = 1.18 | | |
| r19 = 28.235 (aspheric surface) | d19 = 3.49 | n11 = 1.58313 | ν11 = 59.4 |
| r20 = −59.076 | d20 = 0.75 | n12 = 1.84666 | ν12 = 23.9 |
| r21 = 146.800 | d21 = 4.08 | | |
| r22 = −109.888 | d22 = 1.63 | n13 = 1.51633 | ν13 = 64.1 |
| r23 = −29.053 | d23 = variable | | |
| r24 = 60.776 | d24 = 1.89 | n14 = 1.60311 | ν14 = 60.6 |
| r25 = −62.934 | d25 = 0.20 | | |
| r26 = 30.645 | d26 = 0.85 | n15 = 1.84666 | ν15 = 23.9 |
| r27 = 13.673 | d27 = 3.72 | n16 = 1.69680 | ν16 = 55.5 |
| r28 = −182.824 | d28 = variable | | |
| r29 = ∞ | d29 = 21.00 | n17 = 1.70154 | ν17 = 41.2 |
| r30 = ∞ | d30 = 3.50 | n18 = 1.51633 | ν18 = 64.1 |
| r31 = ∞ | | | |

| | focal length | | |
|---|---|---|---|
| variable interval | 4.59 | 20.44 | 52.63 |
| d7 | 1.03 | 26.16 | 34.53 |
| d14 | 37.22 | 12.10 | 3.72 |
| d23 | 9.77 | 6.28 | 7.51 |
| d28 | 4.14 | 7.62 | 6.40 | aspherical coefficient
19'th plane

| K | B | C | D | E | F |
|---|---|---|---|---|---|
| −4.9936e+00 | 6.3843e−06 | −4.8232e−08 | 4.8004e−10 | −7.7948e−12 | 5.70229e−14 |

TABLE 1

| Conditional expression | First numerical embodiment | Second numerical embodiment | Third numerical embodiment |
|---|---|---|---|
| (1) | 0.30 | 0.30 | 0.30 |
| (2) | 0.11 | 0.11 | 0.11 |
| (3) | 64.1 | 64.1 | 64.1 |
| (4) | 60.6 | 64.1 | 60.6 |
| (5) | 49.6 | 53.9 | 49.6 |
| (6) | 0.00 | −0.24 | 0.05 |

Next, description will be made regarding an embodiment of a video camera employing a zoom lens according to the present invention as a photographic optical system with reference to FIG. 13.

In FIG. 13, reference numeral 10 denotes a video camera main unit, and 11 denotes a photographic optical system made up of a zoom lens according to the present invention. Reference numeral 12 denotes a solid-state image pickup element (photoelectric conversion element) such as a CCD sensor, CMOS sensor, or the like which receives an object image by the photographic optical system 11. Reference numeral 13 denotes memory configured to store the information corresponding to an object image photographic-converted by the image pickup element 12, and 14 denotes a finder configured to observe an object image displayed on an unshown display element.

Thus, a zoom lens according to the present invention is applied to an image pickup apparatus such as a video camera or the like, whereby a small image pickup apparatus including high optical performance can be realized. Note that a zoom lens according to the present invention can be applied to a digital still camera as well.

According to the present embodiment, an aspherical lens is disposed at an appropriate position (within a lens unit) of a zoom lens, thereby facilitating realization of high optical performance while realizing reduction in the entire lens length. Also, according to the present embodiment, the lens configuration of a lens unit for image stabilizing is appropriately set, thereby preventing optical performance at the time of correction of image blurring from deteriorating.

Also, according to the present embodiment, a zoom lens can be obtained wherein reduction in size of the entire optical system is realized, and also the decentration aberration at the time of subjecting a lens unit for image stabilizing to eccentricity is reduced, and high optical performance is obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A zoom lens comprising, in order from the object side to the image side:
a first lens unit having positive refractive power;
a second lens unit having negative refractive power;
a third lens unit having positive refractive power; and
a fourth lens unit having positive refractive power;
wherein the third lens unit includes, in order from the object side to the image side
a 3a'th lens sub-unit having negative refractive power, and
a 3b'th lens sub-unit having positive refractive power;
and wherein the second lens unit and the fourth lens unit move on the optical axis during zooming;
and wherein the 3b'th lens sub-unit moves in a direction perpendicular to the optical axis, thereby displacing an image in the direction perpendicular to the optical axis;
and wherein the 3a'th lens sub-unit includes, in order from the object side to the image side
a negative lens element G3an both of whose major surfaces are spherical surfaces, and
a positive lens element, both of whose both major surfaces are spherical surfaces;
and wherein the 3b'th lens sub-unit includes, in order from the object side to the image side
a positive lens element G3bp having an aspherical lens surface, and
a negative lens element;
wherein, when assuming that the indices of the materials of the negative lens element G3an and the positive lens element G3bp are NG3an and NG3bp respectively, a condition of $$0.25 \leq NG3an - NG3bp$$

is satisfied, and wherein when assuming that the index of the material of the positive lens element having the highest index of a material which is part of the fourth lens unit is NG4p, a condition of $$0.07 < NG4p - NG3bp$$

is satisfied.

2. The zoom lens according to claim 1, wherein the 3a'th lens sub-unit consists of, in order from the object side to the image side:
a negative lens element G3an, in which the absolute value of refractive power at the image side surface of this negative lens element G3an is larger than the absolute value of refractive power at the object side surface of this negative lens element G3an; and
a positive lens element, in which the absolute value of refractive power at the object side surface of this positive lens element is larger than the absolute value of refractive power at the image side surface of this positive lens element;
and wherein the both surfaces of this positive lens element are spherical surfaces;
wherein, when assuming that the curvature radii of the object side and image side lens surfaces of the negative lens element G3an are RG3an1 and RG3an2 respectively, the condition $$-1.0 < RG3an2/RG3an1 < 0.1$$

is satisfied.

3. The zoom lens according to claim 1, wherein an image is formed on a solid-state image pickup element.

4. An image pickup apparatus comprising:
a solid-state image pickup element; and
the zoom lens according to claim 1 configured to form an image of an object on the solid-state image pickup element.

* * * * *